United States Patent
Orteu et al.

(10) Patent No.: US 12,187,411 B2
(45) Date of Patent: Jan. 7, 2025

(54) AIRCRAFT FLOOR COMPRISING AT LEAST ONE ARTICULATED MOVABLE FLOOR PART AND AIRCRAFT EQUIPPED WITH SAID FLOOR

(71) Applicant: Airbus Operations SAS, Toulouse (FR)

(72) Inventors: Benoit Orteu, Toulouse (FR); Ludovic Mil, Toulouse (FR); Lionel Laganier, Toulouse (FR); Dominique Marty, Toulouse (FR); Philippe Robert, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 35 days.

(21) Appl. No.: 17/985,199

(22) Filed: Nov. 11, 2022

(65) Prior Publication Data
US 2023/0150646 A1 May 18, 2023

(30) Foreign Application Priority Data
Nov. 15, 2021 (FR) .................................. 2112057

(51) Int. Cl.
*B64C 1/20* (2006.01)
*B64C 39/02* (2023.01)

(52) U.S. Cl.
CPC ............. *B64C 1/20* (2013.01); *B64C 39/02* (2013.01)

(58) Field of Classification Search
CPC .............. B64C 1/18; B64C 1/20; B64C 39/02
See application file for complete search history.

(56) References Cited

U.S. PATENT DOCUMENTS

| | | | |
|---|---|---|---|
| 2006/0226288 A1* | 10/2006 | Vetillard | B64C 1/18 244/119 |
| 2012/0061513 A1* | 3/2012 | Gallant | B64C 1/18 244/119 |
| 2014/0175226 A1 | 6/2014 | Durand et al. | |
| 2015/0307179 A1* | 10/2015 | Ehlers | B64C 1/20 244/118.1 |
| 2017/0211284 A1* | 7/2017 | Nguyen | B64C 1/18 |
| 2019/0256187 A1 | 8/2019 | Prenzel | |
| 2021/0129972 A1* | 5/2021 | Sankrithi | B64C 39/02 |

FOREIGN PATENT DOCUMENTS

| | | |
|---|---|---|
| FR | 2960514 A1 | 12/2011 |
| WO | 2018104403 A1 | 6/2018 |

OTHER PUBLICATIONS

French Search Report dated Jun. 8, 2022; priority document.

* cited by examiner

*Primary Examiner* — Michael C Zarroli
*Assistant Examiner* — Peter A Taraschi
(74) *Attorney, Agent, or Firm* — Greer, Burns & Crain, Ltd.

(57) ABSTRACT

An aircraft floor including at least one hinge connecting movable and fixed floor parts, which has a pivot axis parallel to a longitudinal direction. The floor also includes at least two beams, each including first and second beam portions secured respectively to the fixed and movable floor parts and connected together by a pivot link, and at least one rail including at least one first rail portion secured to the movable floor part and at least one second rail portion secured to the fixed floor part of the floor, extending the first rail portion.

7 Claims, 3 Drawing Sheets

AIRCRAFT FLOOR COMPRISING AT LEAST ONE ARTICULATED MOVABLE FLOOR PART AND AIRCRAFT EQUIPPED WITH SAID FLOOR

CROSS-REFERENCES TO RELATED APPLICATIONS

This application claims the benefit of the French patent application No. 2112057 filed on Nov. 15, 2021, the entire disclosures of which are incorporated herein by way of reference.

FIELD OF THE INVENTION

The present application relates to an aircraft floor comprising at least one articulated movable floor part and to an aircraft equipped with the floor.

BACKGROUND OF THE INVENTION

According to one embodiment, an aircraft comprises a fuselage, wings and a central wing box positioned in the lower part of the fuselage and connecting the wings to the fuselage. The aircraft also comprises a floor positioned above the central wing box separating the fuselage into an upper region positioned above the floor and a lower region positioned beneath the floor. The floor comprises several beams oriented perpendicular to a longitudinal direction, panels attached to these beams and rails parallel to each other, oriented in the longitudinal direction and attached to the beams. When the upper region is fitted out as a passenger cabin, some of the floor panels situated between the rails can be removed in order to access the lower region from the upper region. Since the rails of a passenger cabin are spaced apart at sufficient intervals, the openings left between the rails by the removable panels are sufficient to provide good accessibility to the lower region.

When the upper region is fitted out as a hold for containers, the rails situated on the floor are very close together, meaning that the openings between the rails do not provide easy access to the lower region. Without these openings, the parts situated beneath the floor to either side of the central wing box are inaccessible or difficult to access from the regions situated beneath the floor in front of and to the rear of the central wing box.

The aim of the present invention is to partially or completely overcome the disadvantages of the prior art.

SUMMARY OF THE INVENTION

To this end, the invention relates to an aircraft floor comprising several beams parallel to each other and perpendicular to a longitudinal direction, several rails parallel to each other and to the longitudinal direction, at least one fixed floor part and at least one floor part that is movable relative to the fixed floor part and that has at least one longitudinal edge parallel to the longitudinal direction.

According to the invention, at least two of the beams each comprise a first beam portion secured to a first element chosen from the fixed floor part and the movable floor part and a second beam portion secured to a second element, chosen from the fixed floor part and the movable floor part, different from the first element, the first and second beam portions being aligned, positioned end to end and separated at a cutting plane positioned approximately in line with the longitudinal edge. At least one of the rails comprises at least one first rail portion secured to the movable floor part and at least one second rail portion secured to the fixed floor part, extending the first rail portion. The floor comprises at least one hinge connecting the movable floor part and the fixed floor part, having a pivot axis parallel to the longitudinal direction, the hinge comprising, for at least the two beams, a pivot link connecting the first and second beam portions.

Providing a rail portion at the movable floor part makes it possible to obtain a movable floor part that is wide in a transverse direction, facilitating access to the region situated beneath the floor. The hinge allows this movable floor part to be maneuvered easily. It is therefore possible to access beneath the floor, to either side of the central wing box, in order to carry out operations when assembling the aircraft, install equipment or perform maintenance operations during operation of the aircraft.

According to another feature, each pivot link comprises:
at least one joint plate, connecting the first and second beam portions, which has a first end pressed against the first beam portion and a second end pressed against the second beam portion,
a pivot pin, coincident with the pivot axis of the hinge, which passes through the first beam portion and the first end of the joint plate,
at least one complete link which connects the second beam portion and the second end of the joint plate.

According to another feature, each pivot link comprises two joint plates arranged to either side of the first and second beam portions.

According to another feature, each of the first and second beam portions has a web, each joint plate being pressed against a face of the web of each of the first and second beam portions.

According to another feature, the first beam portion is secured to the fixed floor part, the second beam portion being secured to the movable floor part.

According to another feature, each beam intersecting with the longitudinal edge of the movable floor part, at which the pivot axis is positioned, comprises a cutting plane, positioned approximately at the longitudinal edge, dividing the beam into first and second beam portions connected by a pivot link.

According to another feature, the movable floor part is delimited by first and second longitudinal edges parallel to the longitudinal direction and by first and second front and rear transverse edges perpendicular to the longitudinal direction, the front transverse edge being closely spaced apart from and offset slightly towards the front in relation to a first beam, the rear transverse edge being closely spaced apart from and offset slightly towards the rear in relation to a second beam.

According to another feature, the floor comprises first and second right- and left-hand lateral edges and first and second movable floor parts, the first movable floor part comprising a left-hand longitudinal edge positioned at the left-hand lateral edge of the floor and a right-hand longitudinal edge closely spaced apart from and offset slightly towards the left in relation to a first rail, the second movable floor part comprising a right-hand longitudinal edge positioned at the right-hand lateral edge of the floor and a left-hand longitudinal edge closely spaced apart from and offset slightly towards the right in relation to a second rail.

The invention also relates to an aircraft comprising a floor according to one of the preceding features.

According to another feature, the aircraft comprising a central wing box and a main landing gear casing, the movable floor part is positioned above the central wing box and/or the main landing gear casing.

BRIEF DESCRIPTION OF THE DRAWINGS

Other features and advantages will become apparent from the description of the invention which follows, which description is given only as a non-limiting example, with reference to the accompanying drawings in which.

DETAILED DESCRIPTION OF THE PREFERRED EMBODIMENTS

Figure 1:
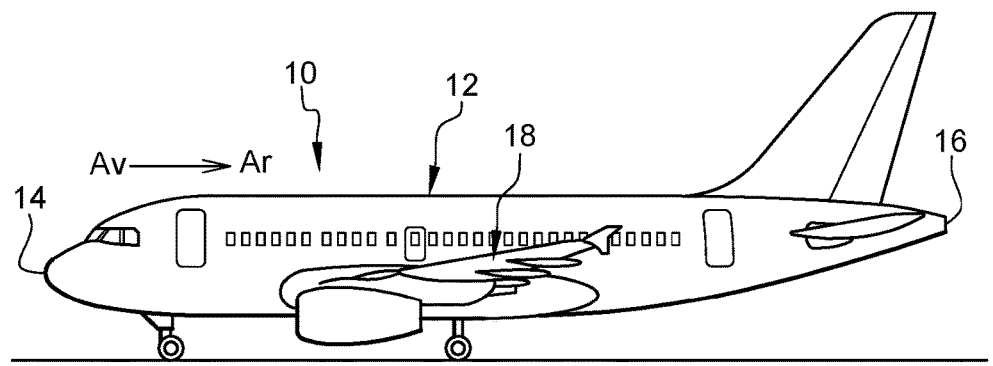
FIG. 1 is a side view of an aircraft.

As shown in FIG. 1, an aircraft 10 comprises a fuselage 12 that extends between a nose cone 14 and a tail cone 16, as well as wings 18 arranged to either side of the fuselage 12 and connected to the latter by a central wing box 20.

Hereinafter in the description, a longitudinal axis 22 of the aircraft 10 corresponds to the horizontal axis (when the aircraft 10 is on the ground) that extends from the nose cone 14 to the tail cone 16 of the aircraft 10. A longitudinal direction is a direction parallel to the longitudinal axis 22. A longitudinal plane is a [plan] plane comprising an axis that is parallel to the longitudinal axis 22. A median longitudinal plane PLM is a vertical longitudinal plane passing through the longitudinal axis 22. A transverse plane is a plane perpendicular to the longitudinal axis 22.

The notions of front (Av) and rear (Ar) refer to the direction of flow of air outside the aircraft during flight, which travels from the front towards the rear.

Figure 2:
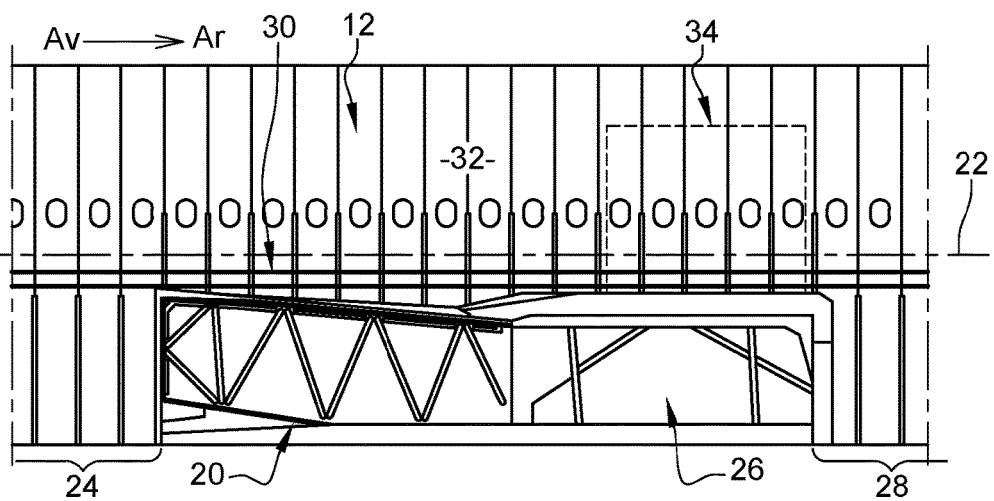
FIG. 2 is a longitudinal cross-section of a part of the fuselage of the aircraft shown in FIG. 1.
Figure 3:
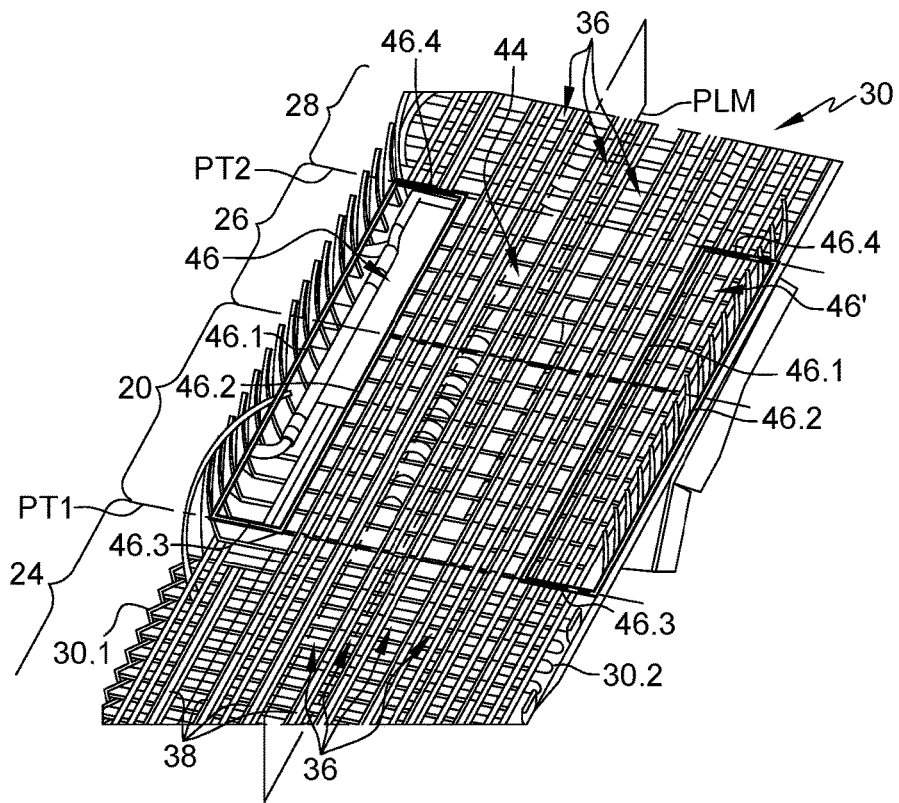
FIG. 3 is a perspective view of the beams and rails of a floor of an aircraft hold showing one embodiment of the invention.

As shown in FIGS. 2 and 3, the fuselage 12 also comprises at least one front fuselage section 24 situated in front of the central wing box 20, a main landing gear casing 26 offset towards the rear in relation to the central wing box 20, at least one rear fuselage section 28 situated to the rear of the main landing gear casing 26 and a floor 30, positioned above the central wing box 20, that extends from the front fuselage section 24 to the rear fuselage section 28.

According to one application, the floor 30 separates the fuselage into an upper region situated above the floor 30 and a lower region situated beneath the floor 30. The upper region situated above the floor 30 forms a hold 32 in which at least one container 34 can be stored (shown with dashed lines in FIG. 2). The floor 30 has first and second lateral edges 30.1, 30.2 adjacent to the fuselage 12, symmetrical to the median longitudinal plane PLM.

Figure 4:
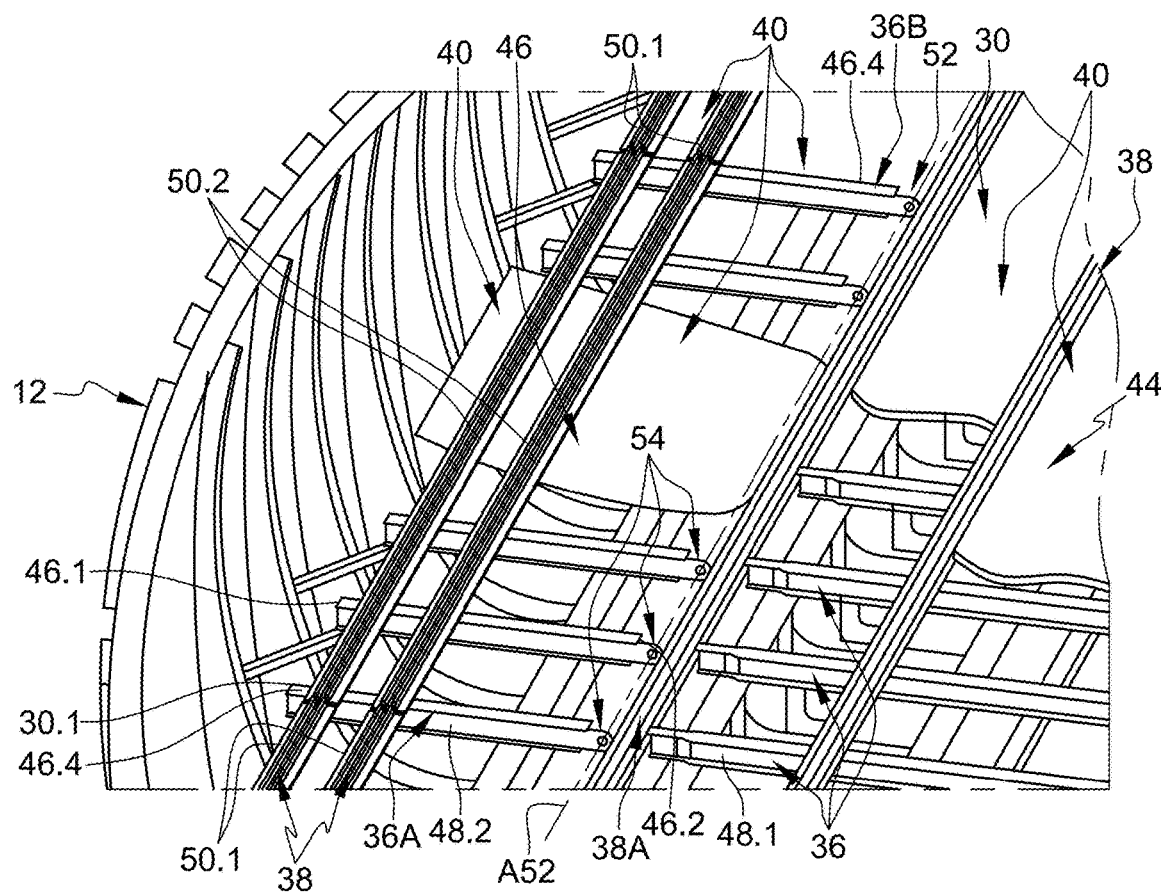
FIG. 4 is a perspective view of a lateral region of the floor shown in FIG. 3.
Figure 5:
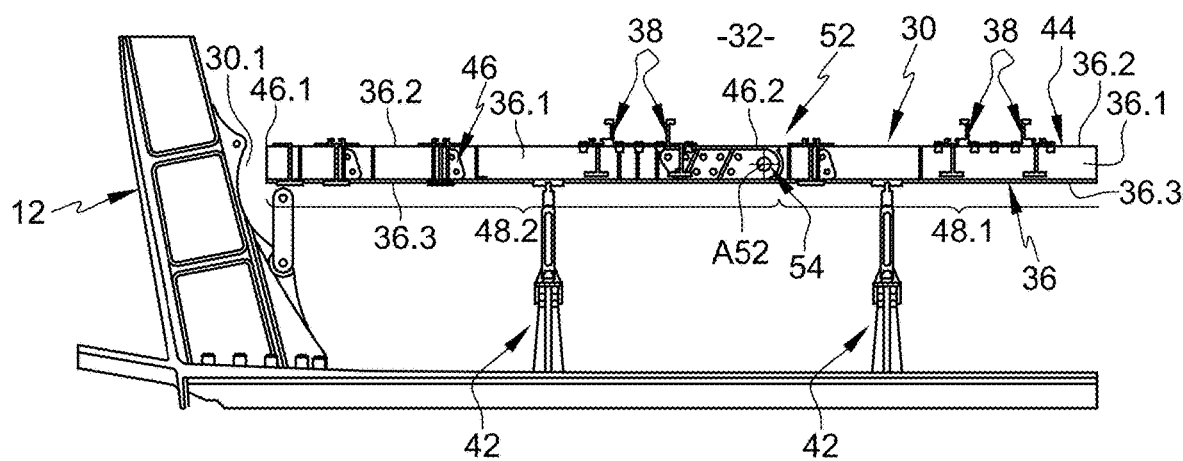
FIG. 5 is a front view of a lateral region of the floor shown in FIG. 3.
Figure 6:
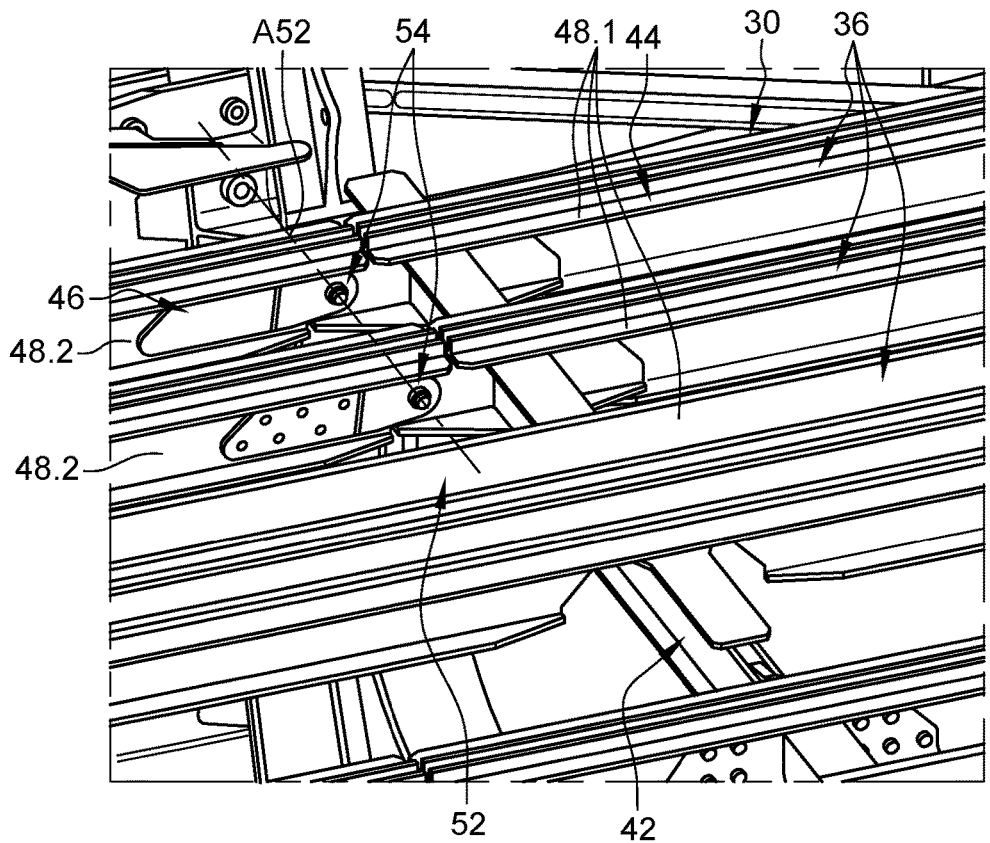
FIG. 6 is a perspective view of a hinge of a movable floor part integrated into a floor of an aircraft hold showing one embodiment of the invention.

According to one embodiment, the floor 30 comprises several beams 36 parallel to each other and perpendicular to the longitudinal direction and several rails 38 attached to the beams 36, parallel to each other and to the longitudinal direction. The floor 30 comprises panels 40 (partially visible in the FIG. 4) positioned between the rails 38 and configured to close the spaces between the rails 38. These panels 40 rest on the beams 36 and/or the rails 38 and are fixed thereto.

The fuselage 12 comprises a load-bearing structure 42, such as longerons or props, for example, supporting the floor 30.

According to one configuration, the floor 30 comprises at least one fixed floor part 44 and at least one movable floor part 46 that is movable relative to the fixed floor part 44, configured to bring the hold 32 into communication with the lower region situated beneath the floor 30. In the region of the fixed floor parts 44, the beams 36 of the floor 30 are fastened to the load-bearing structure 42 of the fuselage 12. In the region of each movable floor part 46, the beams 36 of the floor 30 rest on the load-bearing structure 42 but are not fastened thereto.

Each movable floor part 46, which is approximately rectangular, is delimited by first and second longitudinal edges 46.1, 46.2 parallel to the longitudinal direction and by first and second front and rear transverse edges 46.3, 46.4 perpendicular to the longitudinal direction.

According to one arrangement, the floor 30 comprises several movable floor parts 46, 46' adjoining the first and second lateral edges 30.1, 30.2 of the floor 30; for each of the movable floor parts 46, one of its longitudinal edges 46.1, 46.2 is overlaid on or coincident with one of the lateral edges 30.1, 30.2 of the floor 30. The movable floor parts 46, 46' are arranged symmetrically in relation to the median longitudinal plane PLM.

The floor 30 comprises at least one movable floor part 46 covering a region situated above the central wing box 20 and/or the main landing gear casing 26. According to one configuration, the floor 30 comprises, at each of its lateral edges 30.1, 30.2, a single movable floor part 46, its front transverse edge 46.3 being situated vertically in line with a first transverse plane PT1 which separates the front fuselage section 24 and the central wing box 20, its rear transverse edge 46.4 being situated vertically in line with a second transverse plane PT2 which separates the rear fuselage section 28 and the main landing gear casing 26. According to another configuration, the floor 30 comprises, at each of its lateral edges 30.1, 30.2, several movable floor parts 46, juxtaposed in the longitudinal direction, which extend from the first transverse plane PT1 to the second transverse plane PT2.

According to one arrangement, at least one movable floor part 46 comprises a left-hand longitudinal edge 46.1 positioned at the left-hand lateral edge 30.1 of the floor 30, a right-hand longitudinal edge 46.2 closely spaced apart from and offset slightly towards the left in relation to a rail 38A, a front transverse edge 46.3 closely spaced apart from and offset slightly towards the front in relation to a first beam 36A and a rear transverse edge 46.4 closely spaced apart from and offset slightly towards the rear in relation to a second beam 36B.

At least one movable floor part 46' comprises a right-hand longitudinal edge 46.2 positioned at the right-hand lateral edge 30.2 of the floor 30, a left-hand longitudinal edge 46.1 closely spaced apart from and offset slightly towards the left in relation to a rail 38, a front transverse edge 46.3 closely spaced apart from and offset slightly towards the front in relation to a first beam 36A and a rear transverse edge 46.4 closely spaced apart from and offset slightly towards the rear in relation to a second beam 36B.

To give an idea of the scale, each movable floor part 46 has a width (the dimension considered in a transverse direction) greater than 70 cm, in the region of 1 m, and a length (the dimension considered in the longitudinal direction) greater than 1 m.

According to one embodiment, each beam 36 extends from the first lateral edge 30.1 to the second lateral edge 30.2. According to one configuration, each beam 36 has an I-shaped cross-section comprising a web 36.1 and two flanges 36.2, 36.3 positioned at each of the ends of the web 36.1.

Each rail 38 has a substantially constant profile along its entire length. Each rail extends from the front fuselage section 24 to the rear fuselage section 28. For example, the rail 38 may have a I-shaped, T-shaped, inverted L-shaped, C-shaped or other cross-section.

Naturally, the invention is not limited to these cross-sections for the beams 36 and the rails 38.

Irrespective of the embodiment, several beams 36 extend over at least one fixed floor part 44 and over at least one movable floor part 46 and comprise a first beam portion 48.1 secured to a first element chosen from the fixed part 44 and the movable floor part 46 and a second beam portion 48.2 secured to a second element, chosen from the fixed floor part 44 and the movable floor part 46, different from the first element. The first and second beam portions 48.1, 48.2 are aligned, positioned end to end and separated at a cutting plane positioned approximately in line with one of the longitudinal edges 46.1, 46.2 of the movable floor part 46. Depending on the number of movable floor parts 46, some beams may comprise two or three beam portions.

According to one configuration, the first beam portion 48.1 is secured to the fixed floor part 44, the second beam portion 48.2 being secured to the movable floor part 46.

The cutting planes of the beams 36, positioned approximately in line with the same longitudinal edge 46.1, 46.2 of a movable floor part 46, are substantially coplanar.

According to one arrangement, when the floor 30 comprises two movable floor parts 46 positioned to either side of a fixed floor part 44, some beams 36 each comprise a first central beam portion 48.1 secured to the fixed floor part 44 and second and third beam portions 48.2 positioned in the continuation of each end of the first beam portion 48.1 and secured to the movable floor parts 46.

At least one rail 38 extends over at least one fixed floor part 44 and at least one movable floor part 46 and comprises a first rail portion 50.1 secured to the fixed floor part 44 and a second rail portion 50.2 secured to the movable floor part 46, the first and second rail portions 50.1, 50.2 being aligned, positioned end to end and separated at a cutting plane positioned approximately in line with one of the transverse edges 46.3, 46.4 of the movable floor part 46. According to one configuration, some rails 38 positioned at a movable floor part 46 each comprise a first rail portion 50.1 secured to the movable floor part 46 and second and third rail portions 50.2, 50.3 positioned in the continuation of each end of the first rail portion 50.1 and secured to the fixed floor part 44 of the floor 30. Naturally, the invention is not limited to this configuration.

According to one particular feature, the floor 30 comprises at least one hinge 52 connecting at least one movable floor part 46 and the fixed floor part 44. This hinge 52 has a pivot axis A52 parallel to the longitudinal direction and positioned approximately in line with the cutting planes of the beams 36.

According to one arrangement, each movable floor part 46 is connected to the fixed floor part 44 by a hinge 52.

For at least two beams 36 having cutting planes positioned approximately in line with a longitudinal edge 46.1, 46.2, the hinge 52 comprises a pivot link 54, one for each of the two beams 36, connecting the two beam portions 48.1, 48.2 positioned to either side of the cutting plane.

According to one configuration, each beam 36 intersecting with one of the longitudinal edges 46.1, 46.2 of the movable floor part 46 comprises a cutting plane positioned approximately at the longitudinal edge 46.1, 46.2 dividing the beam 36 into first and second beam portions 48.1, 48.2 connected by a pivot link 54 which has a pivot pin coincident with the pivot axis A52 of the hinge 52.

Figure 7:
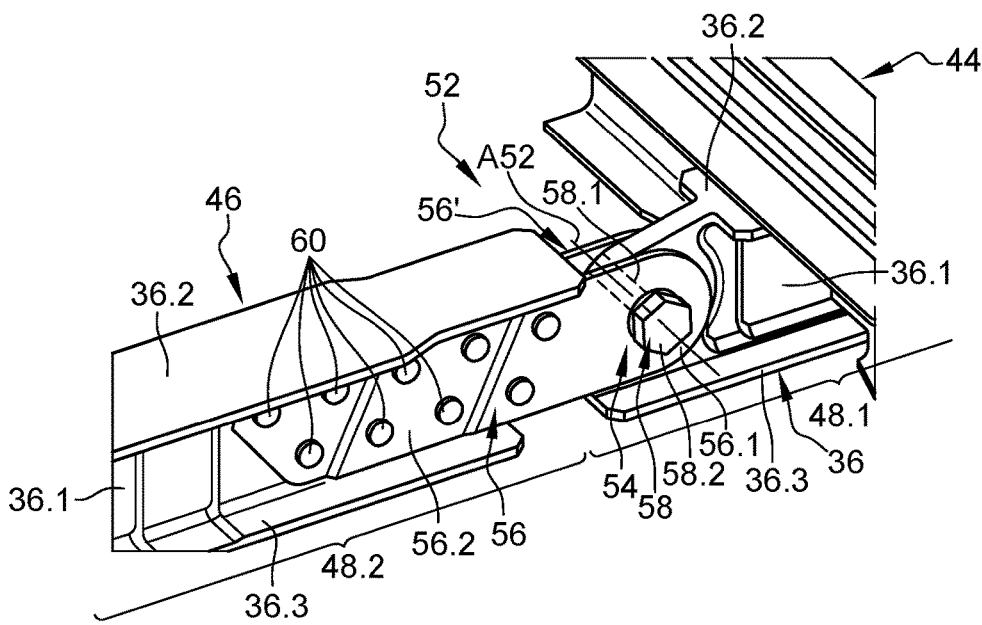
FIG. 7 is a perspective view of a hinge between two portions of a beam of a floor of an aircraft hold showing one embodiment of the invention.

According to one embodiment shown in detail in FIG. 7, each pivot link 54 comprises:
  at least one joint plate 56, connecting the first and second beam portions 48.1, 48.2, which has a first end 56.1 pressed against a first face of the web 36.1 of the first beam portion 48.1 and a second end 56.2 pressed against a first face of the web 36.1 of the second beam portion 48.2,
  a pivot pin 58, coincident with the pivot axis A52 of the hinge 52, which passes through the web 36.1 of the first beam portion 48.1 and the first end 56.1 of the joint plate 56,
  at least one complete link 60 which connects the web 36.1 of the second beam portion 48.2 and the second end 56.2 of the joint plate 56.

The pivot pin 58 comprises a cylinder 58.1 and two abutments 58.2 positioned at each end of the cylinder 58.1, the cylinder 58.1 and the two abutments 58.2 being configured in such a way as to keep each joint plate 56 pressed against the web 36.1 of the first beam portion 48.1. According to one embodiment, the pivot pin 58 is a bolt, the screw of the bolt corresponding to the cylinder and to one of the two abutments, the nut of the bolt corresponding to the other abutment.

Furthermore, the web 36.1 of the first beam portion 48.1 has a through-hole configured to receive the cylinder 58.1 of the pivot pin 58. In parallel, the first end 56.1 of each joint plate 56 has a through-hole configured to receive the cylinder 58.1 of the pivot pin 58.

The complete link 60 is obtained by bonding, bolting, crimping or any other assembly technique.

According to one embodiment, each pivot link 54 comprises two joint plates 56, 56' arranged to either side of the webs 36.1 of the first and second beam portions 48.1, 48.2.

According to one configuration, the pivot pin 58 is provided at the first beam portion 48.1 secured to the fixed floor part 44, each joint plate being connected by a complete link 60 to the second beam portion 48.2 secured to the movable floor part 46.

According to another configuration, the pivot pin 58 is provided at the second beam portion 48.2 secured to the movable floor part 46, each joint plate being connected by a complete link 60 to the first beam portion 48.1 secured to the fixed floor part 44.

Each movable floor part 46 comprises at least one rail portion extended by at least one rail portion secured to the fixed floor part 44. Therefore, each movable floor part 46 has a considerable width (the dimension considered in the transverse direction) which facilitates access to the region situated beneath the floor 30. The hinge 52 allows the movable floor part 46 to be maneuvered easily by making it pivot in order to expose an opening that allows access to the region situated beneath the floor 30.

Providing a pivot link 54 for each beam 36 intersecting with the pivot axis A52 helps obtain a strong link between the movable floor part 46 and the fixed floor part 44, capable of withstanding the weight of the containers 34 positioned on the floor 30.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a fuselage, and
a plurality of load-bearing structures within the fuselage supporting a floor,
the floor comprising:
a plurality of beams parallel to each other and perpendicular to a longitudinal direction,
a plurality of rails parallel to each other and to the longitudinal direction,
at least one fixed floor part, and
at least one movable floor part that is movable relative to the at least one fixed floor part, having at least one longitudinal edge parallel to the longitudinal direction;
wherein each of said plurality of beams comprises:
a first beam portion secured to the fixed floor part, and
a second beam portion secured to the movable floor part,
the first and second beam portions being aligned, positioned end to end and separated at a cutting plane positioned in line with the at least one longitudinal edge of the at least one movable floor part,
wherein at least one of said plurality of rails comprises at least one first rail portion secured to the at least one movable floor part and at least one second rail portion secured to the at least one fixed floor part of the floor, extending said first rail portion,
wherein the floor comprises at least one hinge connecting the at least one movable floor part and the at least one fixed floor part and having a pivot axis parallel to the longitudinal direction, said hinge comprising, each said plurality of beams, a pivot link which connects the first and second beam portions, and
wherein each said first beam portion is fastened to a first load-bearing structure of the plurality of load-bearing structures, and each said second beam portion rests on a second load-bearing structure of the plurality of load-bearing structures without being fastened thereto, wherein each said second beam rests on the second load-bearing structure without being fastened thereto at a location on each said second beam between first and second right- and left-hand lateral edges of the floor,
wherein the floor comprises:
the at least one movable floor part comprises first and second movable floor parts,
the first movable floor part comprising:
a left-hand longitudinal edge positioned at the left-hand lateral edge of the floor and a right-hand longitudinal edge spaced apart from and offset towards the left in relation to a first rail,
the second movable floor part comprising:
a right-hand longitudinal edge positioned at the right-hand lateral edge of the floor, and
a left-hand longitudinal edge spaced apart from and offset towards the right in relation to a second rail,
wherein the left-hand longitudinal edge is positioned at the left-hand lateral edge of the floor and the right-hand longitudinal edge is positioned at the right-hand lateral edge of the floor are adjacent of the fuselage,
said aircraft further comprising:
a central wing box, and
a main landing gear casing,
wherein the at least one movable floor part is positioned above at least one of the central wing box or the main landing gear casing.

2. The aircraft as claimed in claim 1, wherein each pivot link comprises:
at least one joint plate, connecting the first and second beam portions, which has a first end pressed against the first beam portion and a second end pressed against the second beam portion,
a pivot pin, coincident with the pivot axis of the hinge, which passes through the first beam portion and the first end of the joint plate,
at least one complete link which connects the second beam portion and the second end of the joint plate.

3. The aircraft as claimed in claim 2, wherein each pivot link comprises two joint plates arranged to either side of the first and second beam portions.

4. The aircraft as claimed in claim 2, wherein each of the first and second beam portions has a web and wherein each joint plate is pressed against a face of the web of each of the first and second beam portions.

5. The aircraft as claimed in claim 1, wherein the first beam portion is secured to the at least one fixed floor part, the second beam portion being secured to the at least one movable floor part.

6. The aircraft as claimed in claim 1, wherein each beam in said plurality of beams intersecting with the longitudinal edge of the at least one movable floor part at which the pivot axis is positioned, comprises a cutting plane, positioned at the longitudinal edge, dividing each beam into first and second beam portions connected by a pivot link.

7. The aircraft as claimed in claim 1, wherein the at least one movable floor part is delimited by first and second longitudinal edges parallel to the longitudinal direction and by first and second front and rear transverse edges perpendicular to the longitudinal direction, the front transverse edge being spaced apart from and offset towards the front in relation to the first beam of said plurality of beams, the rear transverse edge being spaced apart from and offset slightly towards the rear in relation to the second beam of said plurality of beams.

* * * * *